(12) United States Patent
Seko (10) Patent No.: US 12,409,742 B2
(45) Date of Patent: Sep. 9, 2025

(54) ELECTRIC VEHICLE

(71) Applicant: Honda Motor Co., Ltd., Tokyo (JP)

(72) Inventor: Shigeyuki Seko, Los Banos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 530 days.

(21) Appl. No.: 18/063,296

(22) Filed: Dec. 8, 2022

(65) Prior Publication Data

US 2024/0190270 A1   Jun. 13, 2024

(51) Int. Cl.
| | |
|---|---|
| *B60L 53/00* | (2019.01) |
| *B60H 1/00* | (2006.01) |
| *B60H 1/24* | (2006.01) |
| *B60K 1/04* | (2019.01) |
| *B60K 13/04* | (2006.01) |
| *B60L 53/16* | (2019.01) |
| *B60P 3/07* | (2006.01) |
| *B62K 11/00* | (2006.01) |
| *B62M 7/02* | (2006.01) |
| *F02N 11/08* | (2006.01) |

(52) U.S. Cl.
CPC .......... *B60L 53/00* (2019.02); *B60H 1/00735* (2013.01); *B60H 1/248* (2013.01); *B60K 1/04* (2013.01); *B60K 13/04* (2013.01); *B60L 53/16* (2019.02); *B60P 3/07* (2013.01); *B62K 11/00* (2013.01); *B62M 7/02* (2013.01); *F02N 11/0803* (2013.01); *B62K 2204/00* (2013.01)

(58) Field of Classification Search
CPC ..... B60L 53/00; B60L 53/16; B60H 1/00735; B60H 1/248; B60K 1/04; B60K 13/04; B60P 3/07; B62K 11/00; B62M 7/02; F02N 11/0803
See application file for complete search history.

(56) References Cited

U.S. PATENT DOCUMENTS

| | | | |
|---|---|---|---|
| 11,008,064 | B2 | 5/2021 | Tajiri et al. |
| 2016/0102644 | A1* | 4/2016 | Ouchi ........................ H02P 9/48 |
| | | | 290/31 |
| 2018/0283317 | A1* | 10/2018 | Shigematsu .......... F02D 41/009 |

FOREIGN PATENT DOCUMENTS

| | | |
|---|---|---|
| CN | 2934031 Y | 8/2007 |
| CN | 200940515 Y | 8/2007 |
| CN | 201355789 Y | 12/2009 |
| CN | 202348429 U | 7/2012 |

(Continued)

*Primary Examiner* — Minnah L Seoh
*Assistant Examiner* — Michael R Stabley
(74) *Attorney, Agent, or Firm* — Joshua Freier; American Honda Motor Co., Inc.

(57) ABSTRACT

An electric vehicle including a storage compartment adapted to store a saddle riding vehicle having an engine and a generator adapted to be selectively coupled to the engine to produce electric power. The electric vehicle includes at least one electric motor, at least one rechargeable battery electrically coupled to the at least one electric motor, and at least one charging port to facilitate a charging of the at least one battery. The electric vehicle also includes a switch to start the engine of the saddle riding vehicle and a controller configured start the engine of the saddle riding vehicle to recharge the at least one battery when the at least one charging port is electrically coupled to the generator, the generator is coupled to the engine of the saddle riding vehicle, and the switch is operated to start the engine of the saddle riding vehicle.

20 Claims, 5 Drawing Sheets

(56) References Cited

FOREIGN PATENT DOCUMENTS

| CN | 210106003 U | 2/2020 |
| EP | 1738947 A2 | 1/2007 |
| EP | 1507074 B1 | 1/2018 |
| IN | 202121017461 A | 8/2021 |
| IN | 202131046762 A | 12/2021 |
| JP | 3486491 B2 | 1/2004 |
| WO | 2019235744 A1 | 12/2019 |

* cited by examiner

ELECTRIC VEHICLE

BACKGROUND

The disclosed subject matter relates generally to an electric vehicle. More particularly, the disclosed subject matter relates to a vehicle assembly having an electric vehicle with a storage compartment and a saddle riding vehicle adapted to be arranged inside the storage compartment and suitable to charge the electric vehicle.

Electric vehicles, generally, provide limited mobility or utility for accessing off-road locations, for example, forests, hills, camping sites etc. To a large extent, the capabilities of the electric vehicles are limited at these locations due to unavailability of charging infrastructure for charging the electric vehicles. Therefore, there is a need for a system for charging the electric vehicle and provide last mile connectivity.

SUMMARY

In accordance with one embodiment of the present disclosure, an electric vehicle is provided. The electric vehicle includes a car body defining a passenger compartment and a storage compartment adapted to store a saddle riding vehicle having an engine and a generator adapted to be selectively coupled to the engine to produce electric power. The electric vehicle further includes a plurality of traction members supporting the car body, at least one electric motor operatively coupled to the plurality of traction members and configured to drive the plurality of traction members, and at least one rechargeable battery electrically coupled to the at least one electric motor to provide electric power to the at least one electric motor. The electric vehicle also includes at least one charging port to facilitate a charging of the at least one battery, and a switch adapted to be manually operated to start the engine of the saddle riding vehicle. Moreover, the electric vehicle includes a controller arranged in communication with the at least one charging port, and the switch, and is adapted to be arranged in communication with the saddle riding vehicle. The controller is configured to detect an electrical coupling of the at least one charging port with the generator of the saddle riding vehicle and determine a coupling of the generator with the engine. The controller is configured to start the engine of the saddle riding vehicle to recharge the at least one battery when the at least one charging port is electrically coupled to the generator, the generator is coupled to the engine of the saddle riding vehicle, and the switch is operated to start the engine of the saddle riding vehicle.

In accordance with one embodiment of the present disclosure, a vehicle assembly is disclosed. The vehicle assembly includes a saddle riding vehicle and an electric vehicle. The saddle riding vehicle has an engine and a generator selectively coupled to the engine to produce electric power. The electric vehicle includes a car body defining a passenger compartment and a storage compartment configured to store the saddle riding vehicle, a plurality of traction members supporting the car body, and at least one electric motor operatively coupled to the plurality of traction members and configured to drive the plurality of traction members. The electric vehicle also includes at least one rechargeable battery electrically coupled to the at least one electric motor to provide electric power to the at least one electric motor. Moreover, the electric vehicle includes at least one charging port to facilitate a charging of the at least one battery and a switch adapted to be manually operated to start the engine of the saddle riding vehicle. Furthermore, the electric vehicle includes a controller arranged in communication with the at least one charging port, the at least one battery, and the switch, and is adapted to communicate with the saddle riding vehicle. The controller is configured to detect an electrical coupling of the at least one charging port with the generator of the saddle riding vehicle and determine a coupling of the generator with the engine. Further, the controller is configured to start the engine of the saddle riding vehicle to recharge the at least one battery when the at least one charging port is electrically coupled to the generator, the generator is coupled to the engine of the saddle riding vehicle, and at least one of the switch is operated to start the engine of the saddle riding vehicle or a charge of the at least one battery is below a predefined value.

In accordance with yet further embodiment of the present disclosure, an electric vehicle is disclosed. The electric vehicle includes a car body defining a passenger compartment and a storage compartment adapted to store a saddle riding vehicle having an engine and a generator adapted to be selectively coupled to the engine to produce electric power, a plurality of traction members supporting the car body, and at least one electric motor operatively coupled to the plurality of traction members and configured to drive the plurality of traction members. The electric vehicle also includes at least one rechargeable battery electrically coupled to the at least one electric motor to provide electric power to the at least one electric motor, at least one charging port to facilitate a charging of the at least one battery, and a switch adapted to be manually operated to start the engine of the saddle riding vehicle. Moreover, the electric vehicle includes a controller arranged in communication with the at least one charging port, the at least one battery and the switch, and is adapted to be arranged in communication with the saddle riding vehicle. The controller is configured to detect an electrical coupling of the at least one charging port with the generator of the saddle riding vehicle and determine a coupling of the generator with the engine. Further, the controller is configured to start the engine of the saddle riding vehicle to recharge the at least one battery in response to the at least one charging port is electrically coupled to the generator, the generator is coupled to the engine of the saddle riding vehicle, and at least one of the switch is operated to start the engine of the saddle riding vehicle or a charge of the at least one battery is below a predefined value.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5 wherein like numbers indicate the same or corresponding elements throughout the views.

Figure 1:
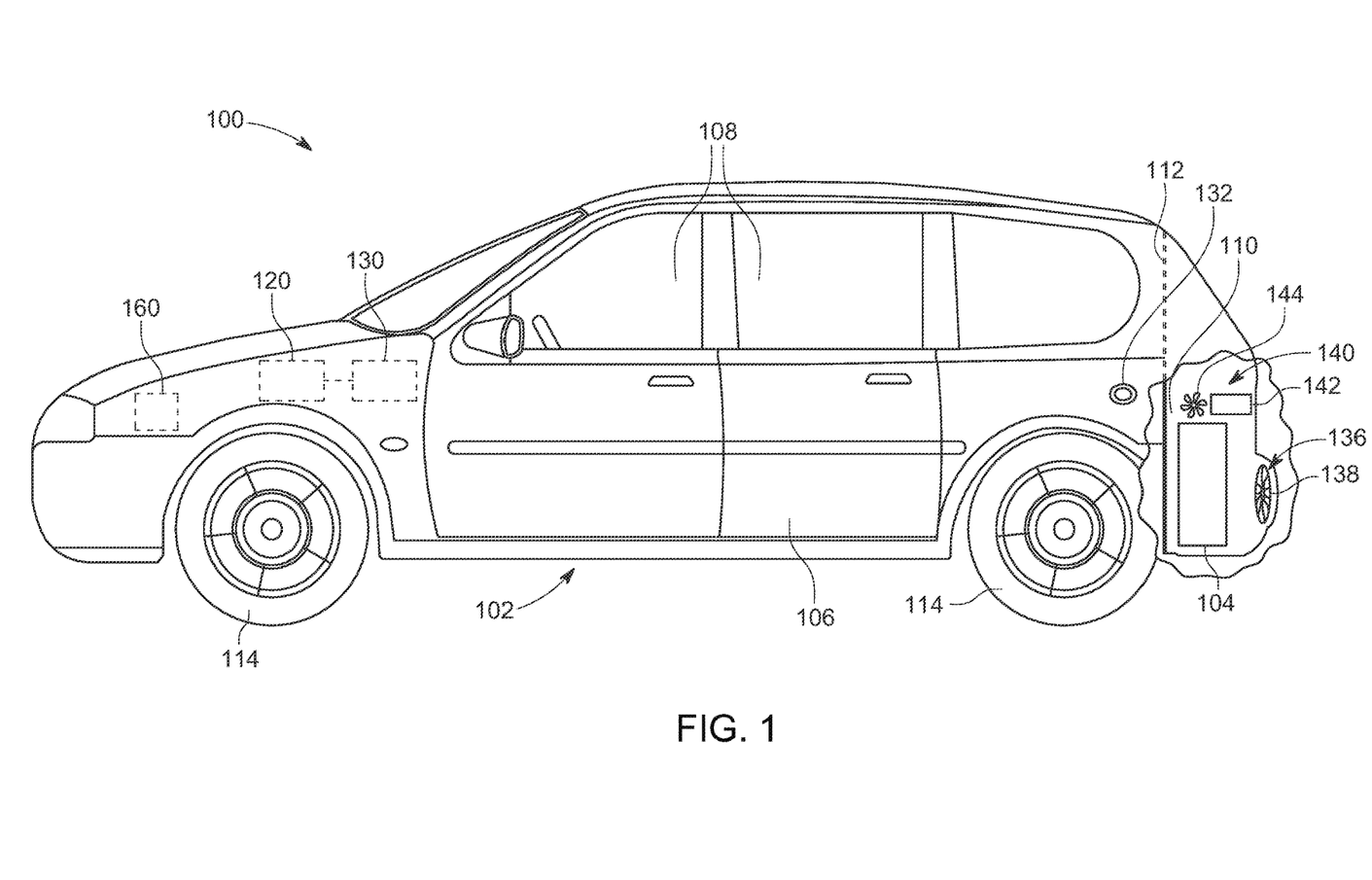
FIG. 1 is a schematic view of a vehicle assembly having an electric vehicle and a saddle riding vehicle arranged inside a storage compartment of the electric, in accordance with one embodiment of the present disclosure.
Figure 2:
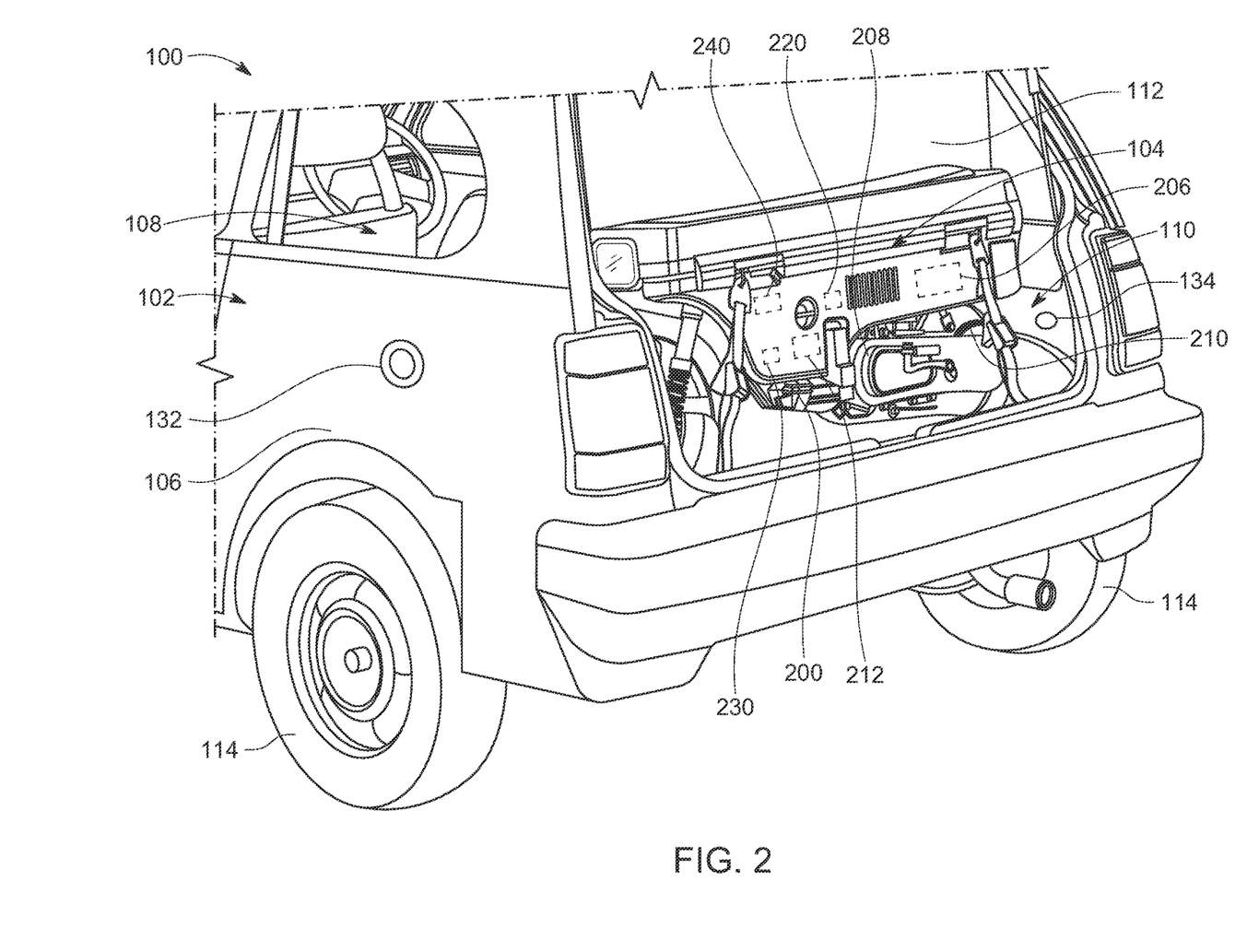
FIG. 2 is perspective view of a rear portion of the electric vehicle having the saddle riding vehicle arranged inside the storage compartment of the electric, in accordance with one embodiment of the present disclosure.

Referring to FIG. 1 and FIG. 2, a vehicle assembly 100 having a four wheeled electric vehicle 102 (hereinafter referred to as vehicle 100) and a straddle riding vehicle 104 arranged inside a storage compartment 110 of the vehicle 102 is shown. The vehicle 102 includes a car body 106 defining at least one passenger compartment 108 to facilitate a seating of at least one person inside the vehicle 102 and the storage compartment 110 to allow a storage of one or more article inside the vehicle 102. The storage compartment 110 and the passenger compartment 108 are separated from each other via a partition wall 112. As shown, the vehicle 102 includes a plurality of traction members, for example, wheels 114, supporting the car body 106 on a surface and enables a movement of the vehicle 102 on the surface. Although the vehicle 102 including four wheels are shown, it may be appreciated that the vehicle 100 may include more than four wheels.

Further, as shown in FIG. 1, the vehicle 102 incudes at least one electric motor 120 operatively coupled to the wheels 114 and configured to provide power to the wheels 114. To operate the at least one electric motor 120 and provide electric power to the at least one electric motor 120, the vehicle 102 includes at least one battery 130. Further, the at least one battery 130 is adapted to provide power to additional components of the vehicle 102. It may be appreciated that the at least one battery 130 is a rechargeable battery, and is adapted to be recharged by an external electric power source by connecting the at least one battery 130 to the external electric power source via a suitable charger. To enable a removable connection of the charger with the vehicle 102 (i.e., the battery 130), the vehicle 102 may include at least one charging port, for example, a first charging port 132 and a second charging port 134 (shown in FIG. 2). In an embodiment, the first charging port 132 may be located at an exterior surface of the vehicle 102, while the second charging port 134 may be arranged/disposed/located inside the storage compartment 110 to facilitate the charging of the at least one battery 130 with the straddle riding vehicle 104 stored/arranged/disposed inside the storage compartment 110. Further, the vehicle 102 may include a switch 135 (shown in FIG. 5), for example, an engine start stop button, adapted to be manually operated to start and stop an engine 200 of the saddle riding vehicle 104 for recharging the at least one battery 130 of the vehicle 102 when the saddle riding vehicle is arranged/stored inside the storage compartment 110.

To facilitate the operation of the engine operated straddle riding vehicle 104 inside the storage compartment 110, and the vehicle 102 may include a ventilation system 136 to vent out any exhaust gas, generated during the operation of the engine 200 of the straddle riding vehicle 104, from the storage compartment 110 to an ambient (i.e., environment). Accordingly, the ventilation system 136 may include at least one exhaust fan 138 adapted to create a suction inside the storage compartment 110 to remove exhaust gas from the storage compartment.

Additionally, the vehicle 102 may include a temperature control system 140 (shown in FIGS. 1 and 5) for maintaining a temperature inside the storage compartment 110 below a predefined value. In an embodiment, the temperature control system 140 includes at least one temperature sensor 142 configured to measure/monitor/detect/determine temperature inside the storage compartment 110, and at least one cooling fan 144 to blow a cool air inside the storage compartment 110 to maintain the temperature below the threshold temperature. In an embodiment, the at least one cooling fan 144 is actuated based on the input from the at least one temperature sensor 142. In some embodiments, the at least one fan may be actuated upon starting of the engine 200 of the straddle riding vehicle 104 irrespective of the temperature inside the storage compartment 110, and the cooling fan 144 keeps operating till the engine 200 of the straddle riding vehicle 104 is running. In some embodiments, the at least one cooling fan 144 may be actuated based on the temperature and the operation of the engine 200 of the straddle riding vehicle 104.

Figure 3:
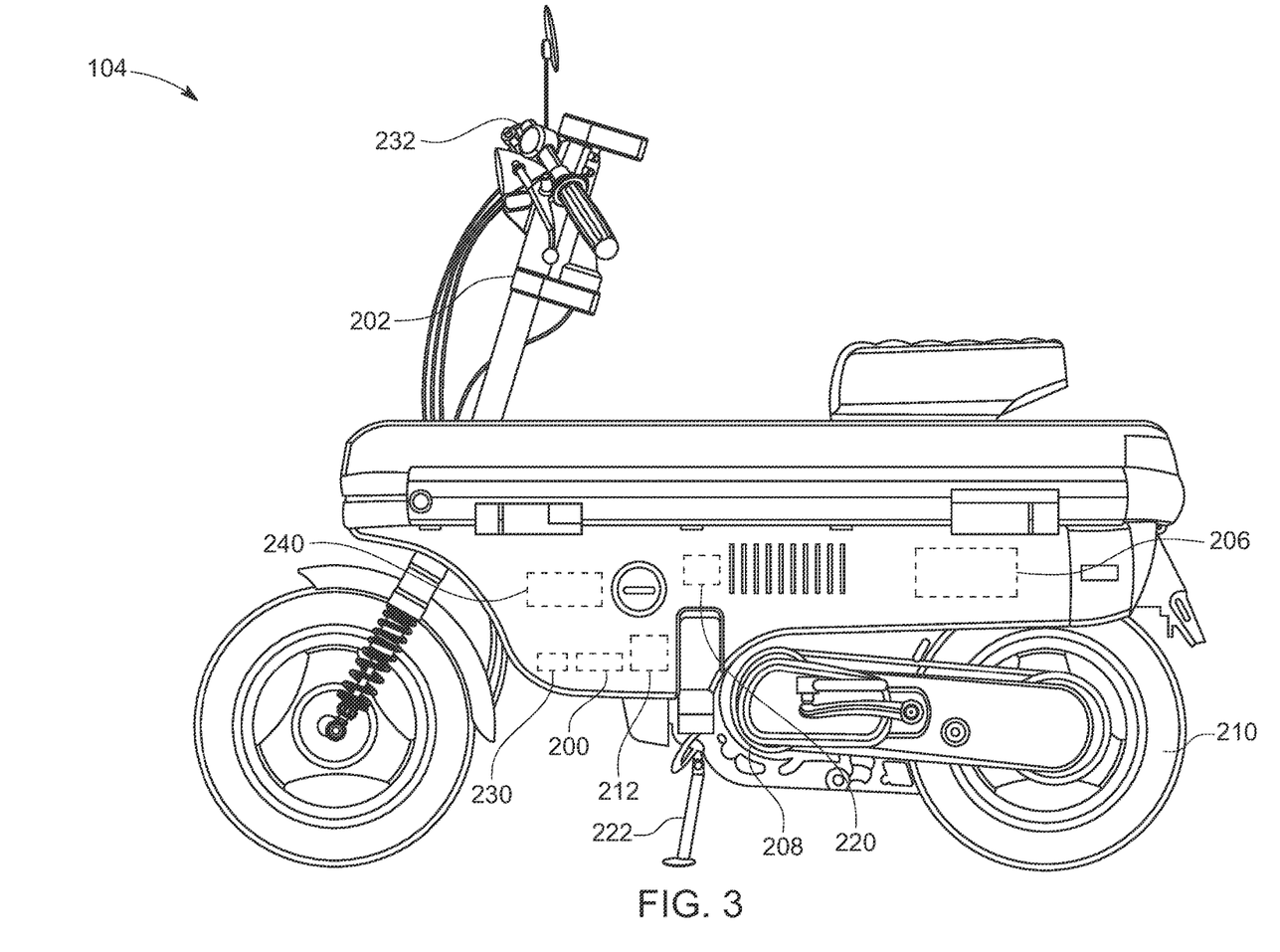
FIG. 3 is a side view of the saddle riding vehicle of FIG. 2, in accordance with one embodiment of the present disclosure.
Figure 4:
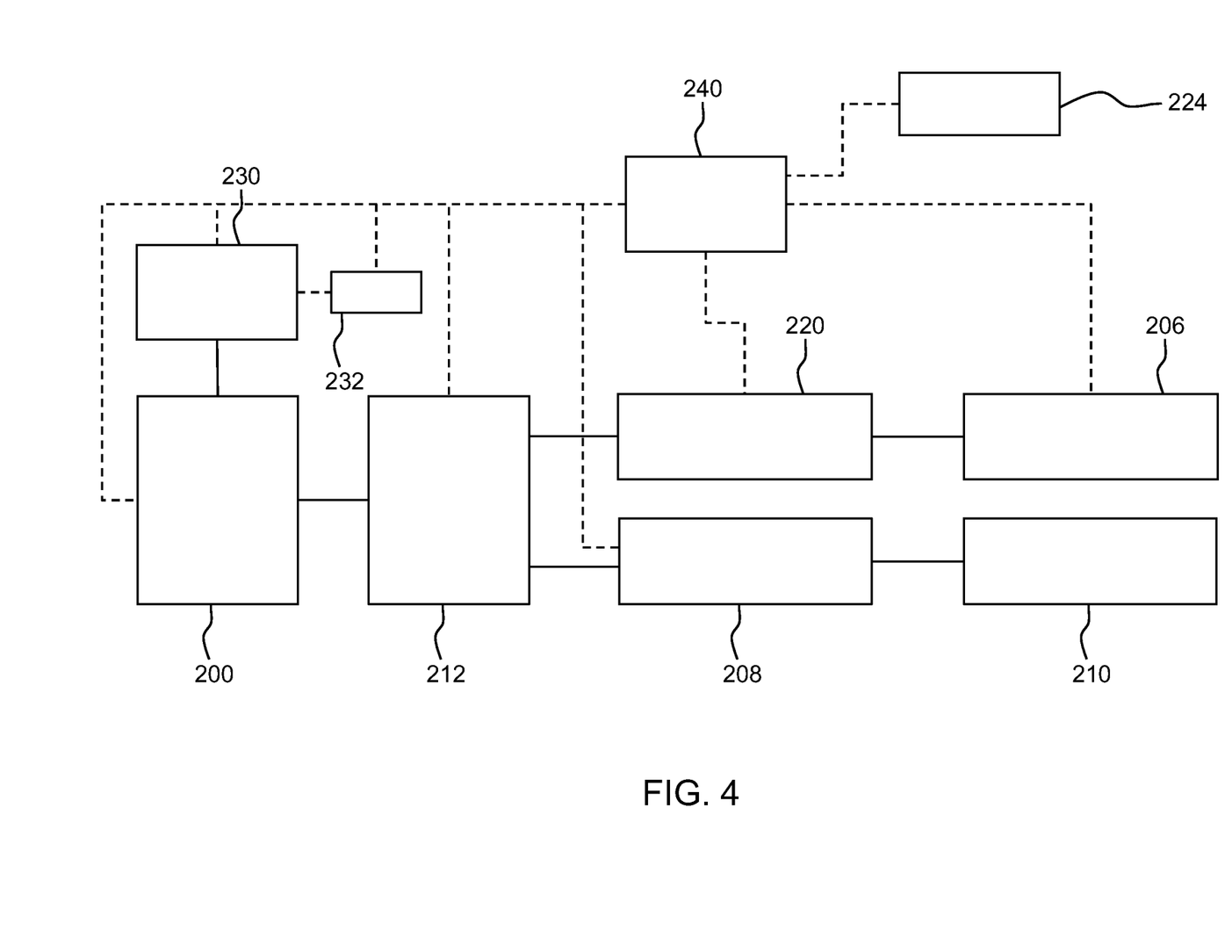
FIG. 4 is a schematic view of various components of the saddle riding vehicle of FIG. 3 depicting a control unit arranged in communication with various components of the saddle riding vehicle, in accordance with one embodiment of the present disclosure.

Referring to FIGS. 2 and 3, the straddle riding vehicle 104 is shown. The straddle riding vehicle 104 may be a foldable vehicle to facilitate a storage of the straddle riding vehicle 104 inside the storage compartment 110. Although the straddle riding vehicle 104 is shown and contemplated as a foldable vehicle, it may be envisioned that other non-foldable straddle type vehicles are within the scope of the disclosure. As shown, the straddle riding vehicle 104 includes a handle 202 that is adapted to move to a folded position (shown in FIG. 2) to enable the storage/positioning of the straddle riding vehicle 104 inside the storage compartment, 110 and a straight position (shown in FIG. 3) to enable a driving of the straddle riding vehicle 104 on a road by a rider.

The straddle riding vehicle 104 includes the engine 200 to facilitate the generation of a power, a generator 206 operatively and removably coupled to the engine 200 and configured to generate electric power, a transmission unit 208 operatively and removably coupled to the engine 200 and configured to transmit motive power to a rear wheel 210 of the straddle riding vehicle 104 to enable a movement of the straddle riding vehicle 104 over a path, and a drive selector 212 to selectively couple the transmission unit 208 (i.e., rear wheel 210) or the generator 206 to the engine 200. In an embodiment, the straddle riding vehicle 104 may include a power generation gear unit 220 arranged between the drive selector 212 and the generator 206 and configured to control a torque and speed being transferred to the generator 206 from the engine 200. In an embodiment, the generator 206 may be a DC generator to facilitate the generation of electric current. In an embodiment, the generator 206 may be a self-excited DC generator or a separately excited DC generator for facilitating the generation of the electric current.

Additionally, in an embodiment, the drive selector 212 is moved between a first position and a second position by manually operating a switch (not shown) that may be arranged on the handle 202 of the straddle riding vehicle 104. In the first position, the drive selector 212 is engaged with transmission unit 208, while in the second position the drive selector 212 is engaged with the power generator gear unit 220, hence the generator 206. Accordingly, the engine 200 is operatively coupled to the transmission unit 208 when the drive selector 212 is arranged in the first position, thereby enabling a transfer of power from the engine 200 to the rear wheel 210, while the engine 200 is operatively coupled to the generator 206 for the generating the electric power when the drive selector 212 is arranged in the second position. In some embodiments, the drive selector 212 is normally arranged at the first position, and is moved to the second position, by a control unit or a controller, in response to the detection of a connection of the generator 206 to the least one charging port, for example, the second charging port 134 via the charger when the saddle riding vehicle 104 is arranged/stored inside the storage compartment 110. Additionally, or optionally, the drive selector 212 may be moved to the second position when the transmission unit 208 is in a neutral position. In an embodiment, the saddle riding vehicle 104 may include a sensor (not shown) to determine the position/status of the transmission unit 208.

Further, the saddle riding vehicle 104 may include an engine starter 230, for example, an electric motor, to crank and start the engine 200. In an embodiment, the engine starter may be configured to be actuated by actuation of a button 232 mounted on the saddle riding vehicle 104. In some embodiments, the saddle riding vehicle 104 may include a control unit 240 (shown in FIGS. 2, 3 and 4), for example, an electronic control unit, arranged in communication with the drive selector 212, the sensor, the transmission unit 208, the generator 206, the engine 200 and the engine starter 230, and is configured to control drive selector 212, the transmission unit 208, the generator 206, the engine, the engine starter 230, and other component of the saddle riding vehicle 104. In an embodiment, the control unit 240 may be configured to control the starting of the engine 200 to operate the generator 206 based on data received from the drive selector 212, the transmission unit 208, the engine starter 230, etc. For example, when the drive selector 212 is in the second position, the control unit 240 is configured to allow the starting of the engine 200 to start the generator 206 when the transmission unit 208 is in the neutral position. In some embodiments, the control unit 240 may determine whether a stand 222 (shown in FIG. 3) of the saddle riding vehicle 104 in an upright position or not before starting the engine 200 to operate the generator 206. In such a case, the control unit 240 may start the engine 200 only when the transmission unit 208 is in the neutral position and the stand is in the upright position. For detecting if the stand 222 is in the upright position, the saddle riding vehicle 104 may include a stand sensor 224 arranged in communication with the control unit 240.

Figure 5:
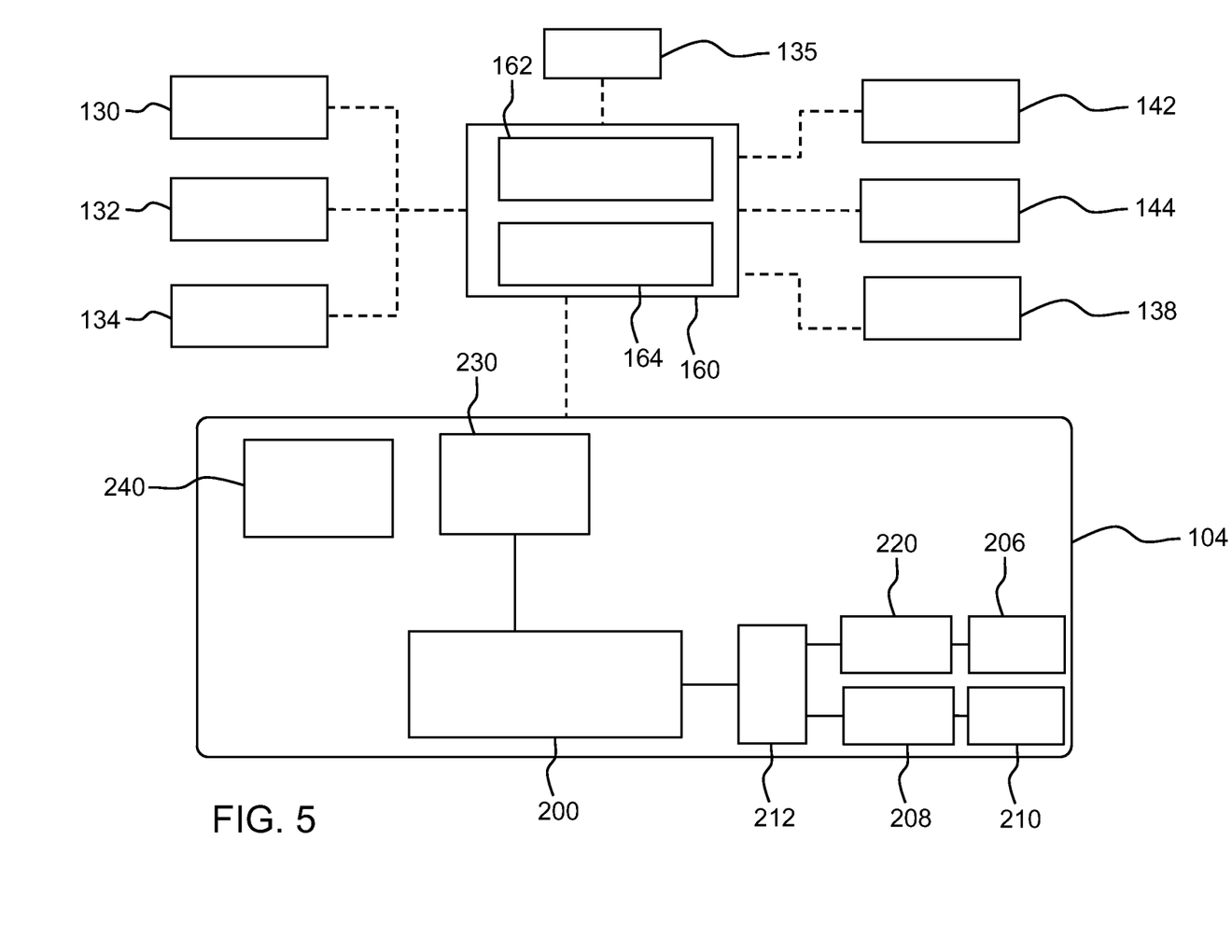
FIG. 5 is a schematic view depicting a controller of the electric vehicle arranged in communication with the saddle riding vehicle and various components of the electric vehicle, in accordance with one embodiment of the present disclosure.

Referring to FIG. 5, the vehicle may include a controller 160 to control the operation of the saddle riding vehicle 104 for recharging the at least one battery 130 of the vehicle 102 when the saddle riding vehicle 104 is arranged inside the storage compartment 110. For recharging the at least one battery 130, the generator 206 of the vehicle 102 is electrically connected to the second charging port 134. Also, the controller 160 is configured to communicate with the engine starter 230, the drive selector 212, and the transmission unit 208, and control the operation of the engine 200 based on one or more inputs from the components of the saddle riding vehicle 104 upon connection of the saddle riding vehicle 104 with the electric vehicle 102. In an embodiment, the controller 160 detects the connection of the saddle riding vehicle 104 with the electric vehicle 102 when the second charging port 134 is electrically coupled to the generator 206 via the charger. Further, the controller 160 is also arranged in communication with the at least one exhaust fan 138, the temperature sensor 142, and the at least one cooling fan 144 and control the at least one exhaust fan 138 and the at least one cooling fan 144.

As shown in FIG. 5, the controller 160 may include a processor 162 for executing specified instructions, which controls and monitors various functions associated with the saddle riding vehicle 104 and the electric vehicle 102. The processor 162 may be operatively connected to a memory 164 for storing instructions related to the functioning and recharging of the electric vehicle 102 and the saddle riding vehicle 104. In an embodiment, the memory 164 may also store various events performed during the operations of the saddle riding vehicle 104 during the recharging of the electric vehicle 102.

As shown, the memory 164 as illustrated is integrated into the controller 160, but those skilled in the art will understand that the memory 164 may be separate from the controller 160 or remote from the controller 160, while still being associated with and accessible by the controller 160 to store information in and retrieve information from the memory 164 as necessary Although the processor 162 is defined, it is also possible and contemplated to use other electronic components such as a microcontroller, an application-specific integrated circuit (ASIC) chip, or any other integrated circuit device that may be used for performing a similar function. Moreover, the controller 160 may refer collectively to multiple control and processing devices across which the functionality of the saddle riding vehicle 104 and the electric vehicle 102 may be distributed.

The controller 160 is configured to determine the connection of the at least one battery 130 to the generator 206 of the saddle riding vehicle 104 via the charger. In an embodiment, the controller 160 determines the connection of the at least one battery 130 with the generator 206 upon connecting the at least one charging port, for example, the second charging port 134 with the generator 206. Moreover, the controller 160 may determine a presence of the saddle riding vehicle 104 inside the storage compartment 110 with the help of suitable sensors.

Further, the controller 160, is response, to receipt of a start request for starting the engine 200, is configured to check a plurality of parameters associated with the saddle riding vehicle 104. In an embodiment, the controller 160 may receipt the request for starting the engine 200 when a switch 135, for example, a start-stop button, mounted inside the vehicle 102 is actuated by a user of the vehicle 102. In some embodiments, the controller 160 may be arranged in communication with the at least one battery 130 and is configured to determine a charge level of the at least one battery 130. In response to the determination that the charge level of the at least one battery 130 is below a predefined value, the controller 160 is configured to determine that the request for starting of the engine 200 of the straddle riding vehicle 104 to charge the at least one battery 130 is received.

Upon determining a request for charging the at least one battery 130, the controller 160 may determine a position of the drive selector 212. In an embodiment, the controller 160 is configured to start the engine 200 if the drive selector 212 in the second position. In a scenario, the controller 160 may determine that the drive selector 212 is disposed in the first position. In such a case, the controller 160 may shift the drive selector 212 to the second position before starting the engine 200. In some embodiments, instead of the automatically shifting the drive selector 212 to the second position, the controller 160 may generate an alert/alarm to inform the driver of the vehicle 102 that drive selector 212 is to be shifted to the second position. In such a scenario, the controller 160 starts the engine 200 in response to the shifting of the drive selector 212 to the second position by the driver. In some embodiments, before starting the engine 200 of the saddle riding vehicle 104, the controller 160 may be configured determine a status of the transmission unit 208 and starts the engine 200 when the transmission unit 208 is in the neutral position. In this manner, the controller 160 facilitates a charging of the at least one battery 130 when the saddle riding vehicle 104 is arranged inside the storage compartment 110 of the vehicle 102 to provide a last mile connectivity.

Additionally, the controller 160 may control and actuate the at least one exhaust fan 138 to remove the exhaust gas, discharged by the engine 200, from the storage compartment 110 to an outside of the vehicle 102 upon detection of the start of the engine 200 and when the saddle riding vehicle 104 is arranged inside the storage compartment 110. Also, the controller 160 may initiate/actuate/start the at least one cooling fan 144 based on input from the temperature sensor 142. In some embodiments, the controller 160 may actuate the at least one cooling fan 144 when the engine 200 is started to recharge the at least one battery 130. In this manner, the at least one battery 130 of the vehicle 102 is charged for moving the vehicle 102 and providing last mile connectivity.

In another example embodiment, the at least one battery 130 may be charged when the saddle riding vehicle 104 is arranged/disposed outside the vehicle 102. In such a case, the control unit 240 controls the staring of the engine 200 to charge the at least one battery 130. In this example embodiment, the control unit 240 may determine the position of the drive selector 212 and a position/status of the transmission unit 208 before starting the engine 200 for recharging the at least one battery 130. The control unit 240 is configured to allow the start of the engine 200 if the transmission unit 208 is in the neutral position upon determination that the drive selector 212 in the second position to recharge the at least one battery 130 by via the generator 206. Additionally, the control unit 240 is configured to detect a position of the stand 222 of the saddle riding vehicle 104, and starts the engine 200 when the stand 222 is an upright position upon determination that the drive selector 212 is in the second position and the transmission unit 208 is in the neutral position. In this manner, the electric vehicle 102 is charged. Moreover, the saddle riding vehicle 104 can be taken along with the electric vehicle 102 for a leisure activity, for example, to visit a remote location during camping. Moreover, the saddle riding vehicle 104 can be used to provide electricity at the camp site.

What is claimed is:

1. An electric vehicle, comprising:
    a car body defining a passenger compartment and a storage compartment adapted to store a saddle riding vehicle having an engine and a generator adapted to be selectively coupled to the engine to produce electric power;
    a plurality of traction members supporting the car body;
    at least one electric motor operatively coupled to the plurality of traction members and configured to drive the plurality of traction members;
    at least one rechargeable battery electrically coupled to the at least one electric motor to provide electric power to the at least one electric motor;
    at least one charging port to facilitate a charging of the at least one battery;
    a switch adapted to be manually operated to start the engine of the saddle riding vehicle; and
    a controller arranged in communication with the at least one charging port, and the switch, and is adapted to be arranged in communication with the saddle riding vehicle, the controller is configured to
        detect an electrical coupling of the at least one charging port with the generator of the saddle riding vehicle,
        determine a coupling of the generator with the engine, and
        start the engine of the saddle riding vehicle to recharge the at least one battery when
        the at least one charging port is electrically coupled to the generator,
        the generator is coupled to the engine of the saddle riding vehicle, and
        the switch is operated to start the engine of the saddle riding vehicle.

2. The electric vehicle of claim 1, wherein the controller is configured to start the engine when a transmission unit of the saddle riding vehicle is in a neutral position, wherein the transmission unit is operatively coupled to a rear wheel of the saddle riding vehicle.

3. The electric vehicle of claim 1, wherein the car body includes a partition wall separating the storage compartment from the passenger compartment.

4. The electric vehicle of claim 1 further including at least one exhaust fan to facilitate a removal of exhaust gas, discharged by the engine of the saddle riding vehicle, from the storage compartment.

5. The electric vehicle of claim 4, wherein the controller is configured to actuate the at least one exhaust fan in response to the starting of the engine of the saddle riding vehicle.

6. The electric vehicle of claim 1 further including
    a temperature sensor to determine a temperature inside the storage compartment, and
    at least one cooling fan to facilitate a flow of air inside the storage compartment.

7. The electric vehicle of claim 6, wherein the controller is configured to actuate the cooling fan based on an input form the temperature sensor.

8. A vehicle assembly, comprising:
    a saddle riding vehicle including
        an engine, and
        a generator selectively coupled to the engine to produce electric power; and
    an electric vehicle including
        a car body defining a passenger compartment and a storage compartment configured to store the saddle riding vehicle,
        a plurality of traction members supporting the car body,
        at least one electric motor operatively coupled to the plurality of traction members and configured to drive the plurality of traction members,
        at least one rechargeable battery electrically coupled to the at least one electric motor to provide electric power to the at least one electric motor,
        at least one charging port to facilitate a charging of the at least one battery,
        a switch adapted to be manually operated to start the engine of the saddle riding vehicle, and
        a controller arranged in communication with the at least one charging port, the at least one battery, and the switch, and is adapted to communicate with the saddle riding vehicle, the controller is configured to
detect an electrical coupling of the at least one charging port with the generator of the saddle riding vehicle,
determine a coupling of the generator with the engine, and
start the engine of the saddle riding vehicle to recharge the at least one battery when
the at least one charging port is electrically coupled to the generator,
the generator is coupled to the engine of the saddle riding vehicle, and
at least one of the switch is operated to start the engine of the saddle riding vehicle or a charge of the at least one battery is below a predefined value.

9. The vehicle assembly of claim 8, wherein the saddle riding vehicle includes
a transmission unit selectively coupled to the engine, wherein the transmission unit is operatively coupled to a rear wheel of the saddle riding vehicle, and
a drive selector adapted to selectively couple the transmission unit or the generator to the engine.

10. The vehicle assembly of claim 9, wherein the drive selector is adapted to be arranged in a first position and a second position, wherein
in the first position, the drive selector couples the engine to the transmission unit, and
in the second position, the drive selector couples the engine to the generator.

11. The vehicle assembly of claim 9, wherein the controller is configured to start the engine when the transmission unit of the saddle riding vehicle is in a neutral position.

12. The vehicle assembly of claim 8, wherein the car body includes a partition wall separating the storage compartment from the passenger compartment.

13. The vehicle assembly of claim 8, wherein the electric vehicle includes at least one exhaust fan to facilitate a removal of exhaust gas, discharged by the engine of the saddle riding vehicle, from the storage compartment.

14. The vehicle assembly of claim 13, wherein the controller is configured to actuate the at least one exhaust fan in response to the starting of the engine of the saddle riding vehicle.

15. The vehicle assembly of claim 8, wherein the electric vehicle includes
a temperature sensor to determine a temperature inside the storage compartment, and
at least one cooling fan to facilitate a flow of air inside the storage compartment.

16. An electric vehicle, comprising:
a car body defining a passenger compartment and a storage compartment adapted to store a saddle riding vehicle having an engine and a generator adapted to be selectively coupled to the engine to produce electric power;
a plurality of traction members supporting the car body;
at least one electric motor operatively coupled to the plurality of traction members and configured to drive the plurality of traction members;
at least one rechargeable battery electrically coupled to the at least one electric motor to provide electric power to the at least one electric motor;
at least one charging port to facilitate a charging of the at least one battery;
a switch adapted to be manually operated to start the engine of the saddle riding vehicle; and
a controller arranged in communication with the at least one charging port, the at least one battery and the switch, and is adapted to be arranged in communication with the saddle riding vehicle, the controller is configured to
detect an electrical coupling of the at least one charging port with the generator of the saddle riding vehicle,
determine a coupling of the generator with the engine, and
start the engine of the saddle riding vehicle to recharge the at least one battery in response to
the at least one charging port is electrically coupled to the generator,
the generator is coupled to the engine of the saddle riding vehicle, and
at least one of the switch is operated to start the engine of the saddle riding vehicle or a charge of the at least one battery is below a predefined value.

17. The electric vehicle of claim 16, wherein the controller is configured to start the engine when a transmission unit of the saddle riding vehicle is in a neutral position, wherein the transmission unit is operatively coupled to a rear wheel of the saddle riding vehicle.

18. The electric vehicle of claim 16, wherein the car body includes a partition wall separating the storage compartment from the passenger compartment.

19. The electric vehicle of claim 16 further including
at least one exhaust fan to facilitate a removal of exhaust gas, discharged by the engine of the saddle riding vehicle, from the storage compartment, and
the controller is configured to actuate the at least one exhaust fan in response to the starting of the engine of the saddle riding vehicle.

20. The electric vehicle of claim 16 further including
a temperature sensor to determine a temperature inside the storage compartment,
at least one cooling fan to facilitate a flow of air inside the storage compartment.

* * * * *